Nov. 28, 1950 H. J. MURRAY 2,531,823

COLOR TELEVISION APPARATUS

Filed Nov. 13, 1946

Inventor

Howard J. Murray

UNITED STATES PATENT OFFICE 2,531,823

COLOR TELEVISION APPARATUS

Howard J. Murray, New York, N. Y.

Application November 13, 1946, Serial No. 709,472

11 Claims. (Cl. 178—5.2)

This invention relates in general to stationary color control apparatus and more specifically to color control apparatus for television receiving apparatus.

One of the objects of the present invention is to provide stationary apparatus non-mechanical which can be employed with television apparatus to transmit actions of colored images from a near to a remote place so that the said colored actions will be usefully reproduced in a natural color at the said remote place.

Still another object of the present invention is to provide electro-electron-optical stationary means arranged so that light derived from an electron bean will be selectively colored in a predetermined sequence periodically repeated.

An additional object of the present invention is to provide stationary electronically actuated and electronically controlled colored image scanning apparatus.

A further object of the present invention is to provide electronic means for changing the color of a scanning spot of light as it moves along a path periodically repeated.

A still additional oject of the present invention is to provide a combination of electronically associated non-mechanical stationary means for producing plane rotated polarized light and sequentially changing the color of the said light according to the characteristics of a related electron beam and transmitted color signals related to the said characteristics.

A still further object of the present invention is to provide stationary color television apparatus which can be used with conventional black and white transmission and reception.

In the following description names will be given to parts for convenience of expression, but these names are intended to be as generic in their application to similar parts as the art will permit.

The present invention is a further development of the inventions disclosed in my U. S. Patents Nos. 2,169,071 issued Aug. 8, 1939 and 2,225,922 issued Dec. 24, 1940 and my U. S. applications Serial Nos. 534,227 filed May 5, 1944—665,685 filed April 29, 1946, now abandoned and 667,524 filed May 6, 1946, now abandoned.

The invention allows numerous physical embodiments and different types are herein illustrated for the purpose of showing the wide application of the invention, but it is understood that the drawings are largely diagrammatic merely being sufficient in detail to show embodiments of the invention.

Figures 1, 2, 3, 4, 5, 6, 7, 8, 9:
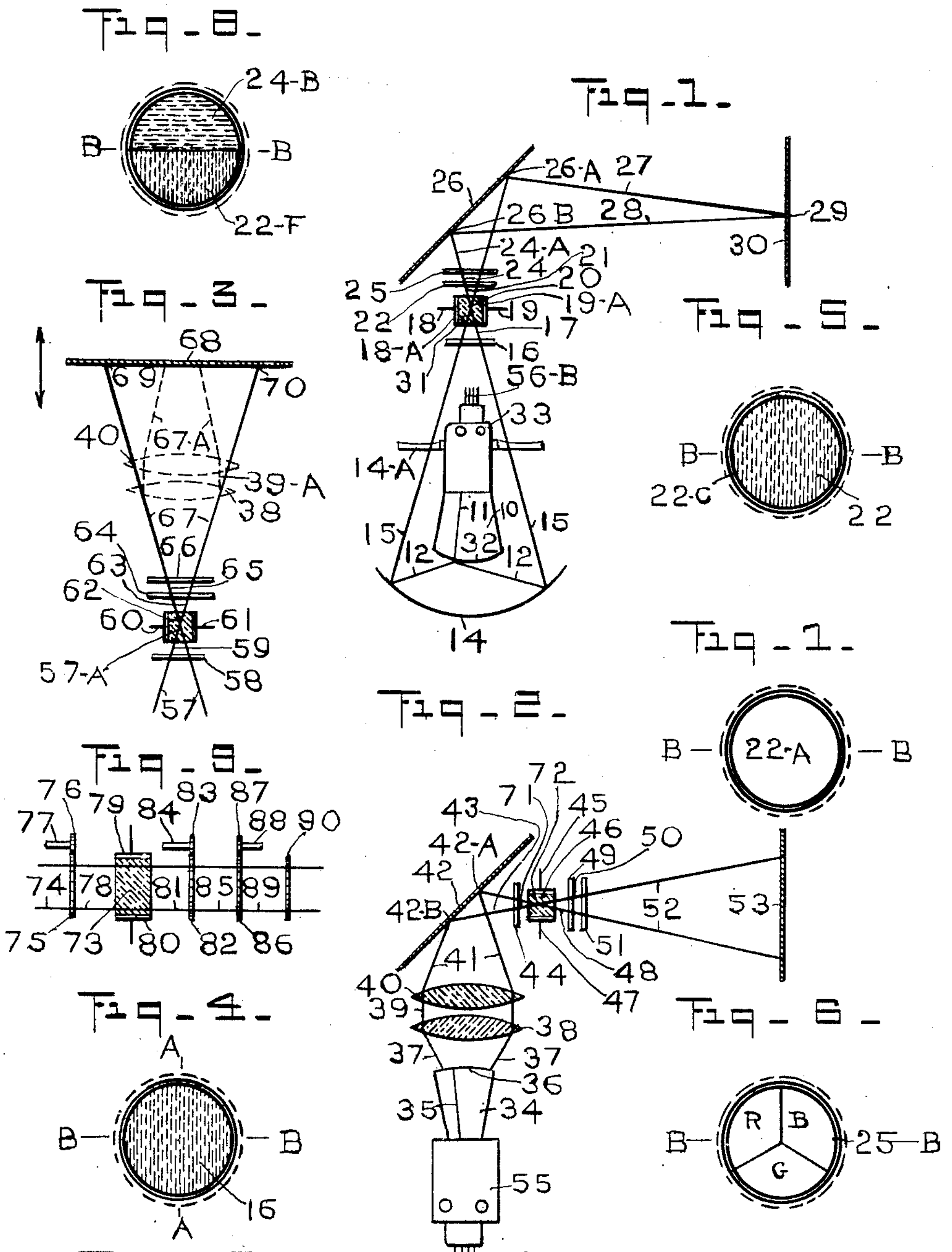
Figure 1 is a diagrammatic presentation of color control television apparatus wherein polarized light is derived from an electron beam.
Figure 2 is a diagrammatic presentation of component color television apparatus constituting a modification of the means of Figure 1.
Figure 3 is a diagrammatic presentation of still another modification of the color control means of Figure 1.
Figure 4 is a plan view of an embodiment of a light polarizing means.
Figure 5 is a plan view of a polarized light analyzing means.
Figure 6 is a plan view of an embodiment of a disc-like polarized light wave-changing means having three light double refracting sections of different characteristics.
Figure 7 is a plan view of an embodiment of the light wave-changing means of Figure 6 including a disc-shaped pile of double refracting film disc with the discs in one circular holding-rim piece.
Figure 8 is a modification of the polarized light analyzing means of Figure 5.
Figure 9 is a modification in more or less diagrammatic form of the means of Figure 3.

Referring now to the embodiment of my invention as shown by Figure 1 there is seen a conventional image reproducing electron beam tube and associated fluorescent screen generally identified by the numeral 10 and conventionally from the terminals 56—B energized as to produce an electron beam 11. This beam 11 impinges on the screen portion 32 so that visible energy hereinafter designated as light 12—13 is derived therefrom to be substantially reflected from the surface of the reflector 14 through the correcting lens 14—A to the focal point 20.

A conventional plane polarizing means 16 (see Figure 4) is positioned in the path of the reflected focused light 15 after it passes through the correcting lens 14—A. The said means 16 can be formed from conventional polarizing film such as Polaroid and curved so as to be symmetrically arranged about the focal point 20, altho the said film can also be flat when required. It is also contemplated that in some embodiments the correcting lens 14—A will not be employed.

A light plane polarization rotating medium 31 preferably a solid dielectric medium is positioned so as to include the said focal point 20 as centrally as possible and to be operatively associated with the electrodes 18—A and 19—A connected to the supply leads 18 and 19 in turn connected to a source of plane polarization rotating energy related to the energy supplied to electron beam tube 10 such an image frame synchronizing pulses upon which is superimposed color field synchronizing pulses. It should be noted at this time that the light 15 may be passed through a conventional filter (not shown) so as to become monochromatic before passing the plane polarization means 16 if such light is desired. The medium 31 may be wrapped with a magnetic flux producing winding in place of the said electrodes 18—A and 19—A.

This said rotating medium 31 can be made of flint or jena glass or any one of the many well known plane rotating mediums such as transparent metallic film and is normally positioned so as to include the said focal point 20 approximately centrally.

Now let it be assumed for the purpose of this description that the said plane rotating medium 31 is made of a transparent dielectric medium so as to include end surfaces with elementary portions collectively constituting opposite surfaces of a lens. In other words the end surfaces of the medium 31 in the path of the polarized light 17 are curved in this particular embodiment to properly transmit the polarized light 17 through the said medium 31.

Figure 10:
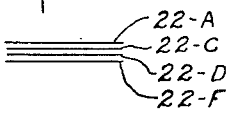
Figure 10 is a sectional view in elevation of the double refracting discs constituting the wave-changing means of Figure 7.

In this event the plane rotated polarized light 21 will be transmitted through the wave-length affecting double refracting film discs 22—A of the means of Figure 7 (see Figure 10). These discs are individually seen by references to Fig. 10 and identified by the numerals 22—A, 22—C, 22—D and 22—F. It is understood that the discs may be replaced by any of the wave-changing or retarding media hereinafter described and may be of any desired shape. For example, three of the media of wave-affecting means of Figure 6 are arranged in three sectors of 120 degrees each to complete a 360 degrees disc and the media R may be formed from entirely different material than the media of sectors B and/or G.

The plane rotated wave-affected polarized light 24 is now analyzed for color by transmission through the analyzing means 25 or the analyzing means of Fig. 5 and Figure 8 as hereinafter described.

After being plane and/or color analyzed the wave affected colored light 24 is intercepted and reflected from the reflecting surface of the reflector member 26 as colored light 27—28 converging at a focal point 29 moving as a spot of light according to the characteristics of the parent electron beam 11 and the said synchronizing pulses imposed on the leads 18 and 19. A conventional fluorescent screen of the proper contour is positioned approximately in the path of the said moving focal point 29.

While the reflecting surface 26—A to 26—B of the reflector member 26 is indicated on the drawings as being approximately flat, it will be obvious to those skilled in the optical art that the said reflecting surface 26—B may also be curved so as to conform to the conditions under which the means of Figure 1 will be installed and operated. In this event, the light 27—28 may diverge or converge to the screen 30. The surface of the said screen 30 obviously will be optically related to the contour of the said reflector surface 26—B.

Referring now to another of the modifications of my invention as shown by Figure 2, there is indicated a conventional source of an image modulated electron beam 35 generally indicated by the numeral 34 and including the conventional supply terminal leads such as 56—A and a conventional beam deflecting winding 55. The said electron beam 35 impinging on the fluorescent screen 36 or other intercepting means provides a source of energy hereinafter designated as light (visible or invisible). This electron beam derived light 37 is optically changed into the converging light 41 by the conventional optical means 38 and 40 thereafter to be intercepted by the reflecting surface of the reflecting member 42 and reflected as light 43 converging to the focal point 72. A light polarizing means of more or less conventional design as 44 is operatively positioned in the path of the said converging light 43 between the reflector means 42 and the focal point 72.

A plane polarization rotating means including the plane rotating medium 46 is preferably positioned symmetrically about the said focal point 72 so as to approximately centrally include the same. Conventional electrodes for energizing the medium 46 are connected to the supply leads 45 and 47—in turn connected to a source of image frame synchronizing pulses upon which is conventionally superimposed color field synchronizing pulses.

The reflected light 43 plane polarized by the polarizing means 44 to become plane polarized light 71 and plane rotated by the means 46 thence passes through the wave-affecting medium 49 as plane rotated light 48 to become plane rotated wave-affected polarized light 50. The said colored light 50 is analyzed by the conventional analyzer 51 to become colored converging light 52 intercepted by the fluorescent screen means 53.

By means of Figure 3 there is shown still another modification of the means of Figure 1 comprising a source of either heterochromatic or monochromatic light as desired (not shown). The said light 57 preferably converges to the focal point 57—A within a plane rotating medium 62 forming a portion of a conventional Kerr cell including the electrode plates 60 and 61.

The light 57 is plane polarized in the normal plane as it passes through the conventional plane polarizing means 58 and thence plane rotated as it is transmitted through the plane rotating medium 62 in accordance with E. M. F. impressed on the leads 60 and 61 of the said electrodes. The diverging light 63 is wave affected and/or retarded by the light double refracting wave affecting medium 63 (see Figures 6 and 7). The wave affected light 65 is then visibly colored by transmission through the analyzing means 66 (see Figures 8 and 9).

The conventional lenses 38 and 40 of Figure 2 can be placed in the path of the colored light 67 to cause the said light to converge as light 67—A. (See dotted lines). Without the said lenses the said light 67 will diverge to the intercepting fluorescent screen 68. It is obvious that the said intercepting means 68 can be adjustably moved relative to the focal point 57—A as indicated by the double headed arrow of Figure 3.

By means of Figure 9 there is shown an additional modification of the means of Figure 1 whereby a beam of light 74 is provided from a source (not shown) and preferably with parallel rays. The light 74 is plane polarized by means of the adjustable rotatable toothed polarizing means 75 (see Fig. 4) tooth connected to the pinion 76 mounted on the rotatable shaft 77. A plane polarization rotating medium 73 with electrodes 79 and 80 is positioned in the path of the polarized light 78. A rotatable toothed wave-affecting means 82 (see Figures 6 and 7) is positioned in the path of the rotated polarized light 81. The adjustable means 82 is drive related to the pinion 83 mounted on the rotatable shaft 84. A rotatable analyzing means 86 (see Figures 8 and 9) is drive connected to the pinion 87 rotatably mounted on the shaft 88 so as to selectively and rotatably intercept the wave affected polarized light 85. The colored polarized light 89 is then intercepted by the screen 90. Thus all of the means of Figure 9 are rotatable. The means 86, 75, 82, 73, 80 and 90 are preferably adjustably rotatable about a common axis relative to each other and to the said light.

Let it be further understood for the purpose of this description that the following adaptions to conventional television apparatus combinations are contemplated according to the present disclosure.

(a). Black and white television receiving means whereby an oscillating electron beam is employed to produce an oscillating beam of light of approximately constant intensity. The said light beam is plane polarized, plane polarization rotated to be modulated by reflection as a function of the said rotation and intercepted by a screen to visibly appear as a spot of light moving with the characteristics of the said electron beam and varying in intensity as a function of the said plane rotation.

(b). Non-mechanical color television apparatus whereby an electron beam of approximately constant intensity is produced and light (visible and/or invisible) is derived therefrom to be sequentially and progressively plane polarized, plane polarization rotated, wave-length (frequency) affected and analyzed and thence transmitted to a screen.

(c). Electro-electronic-optical color television apparatus including stationary means whereby an electron beam oscillating with approximately constant intensity is provided and light related thereto is refracted preferably to converge on a reflecting member so as to converge to a focal point and thence diverge to impinge on a light sensitive element or intercepting member such as a screen. The said light being plane polarized, plane rotated, and wave-affected and analyzed in accordance with the said oscillation and the said rotation.

(d). Color television appartus whereby an oscillating electron beam is provided with image modulations and the modulated light obtained therefrom is wave retarded or transformed according to the plane rotation thereof. The polarized colored light is again reflected so as to appear as light moving with the characteristics of the said electron beam and colored in accordance with the said plane rotation.

(e). Color television apparatus wherein an oscillating modulated electron beam is provided and light is obtained from the said beam and optically affected to pass through a focal point and thence be intercepted by a light sensitive circuit element or a screen.

(f). Coloring apparatus for light whereby polarized light is provided and transmitted through a focal point, plane rotated in the vicinity of the said focal point, diverging to be wave retarded or transformed as a function of the said plane rotation. The said light being colored by analyzation and intercepted by conventional means such as screen, light sensitive circuit element.

(g). Television apparatus by means of which the polarized light obtained by the apparatus described by paragraph (f) is optically controlled to converge to a focal point so that the area of the resultant colored light will vary with the relative movement of the intercepting means.

(h). Light decomposing and reassembling means whereby a beam of light with preferably parallel rays is provided to be selectively plane polarized, plane rotated, wave affected, analyzed and intercepted by adjustable rotatable means positioned along the optical axis of the said light.

*In operation*

Referring to the embodiment of my invention as shown by the means of Figure 1, there will be seen conventional apparatus for deriving energy indicated by the numerals 12 and 13 (hereinafter referred to as light) from an oscillating electron beam 11. The reflected light 15 derived therefrom will have the characteristics of the said beam 11 as it passes through the correcting lens 14—A and thence through the plane polarizing means 16 to become plane polarized light 17 converging to the focal point 20. Let it be assumed that predetermined E. M. F. related to the said characteristics is impressed on the leads 18 and 19 connected to the electrodes 18—A and 19—A to energize the plane polarization rotating medium 31 thereby to plane rotate the polarized light 17 as it is transmitted through the said transparent plane rotating medium 31. If the said E. M. F. impressed on the leads 18 and 19 is related to certain characteristics of the electron beam 11, the rotation of the plane polarization of the plane rotated light will also be related to the said certain characteristics of the said electron beam 11. It is obvious that the medium 31 may also be energized by current related to the said beam 11. In other words, magnetic plane rotated light means will be substituted for the electrically plane rotated light means. The light 17 can also be desirably tinted or colored without departing from the spirit of my invention.

The plane rotated light 21 is now transmitted through double refracting wave affecting means 22 (see Figures 6 and 7). In one embodiment of my invention, the means of Figure 7 consisted of 5 thin sheets of cellophane used in wrapping lamp shades. These cellophane sheets were placed between two clear glass discs which were cemented together. I used many different media during the development of my invention, including sheets of mica, transparent Bakelite, sheets selected from the plastic group made of acrylate, cellulose acetate, phenol-formaldehyde, polyvinyl, ethyl cellulose, cellulose nitrate, polystyrene and many other materials.

For the purpose of this description, let it be assumed that several thin sheets of cellophane are used. When the plane rotated light 21 is passed through the said sheets one after the other as light 24 and thence through the analyzer means 25 (see Figures 8 and 9) the light 24—A will be uniformly colored. The color will change as the plane polarization is rotated. The light 24—A will be changed through a sequence of spectrum colors as a function of the extent and direction of said plane rotation. The colors of light 24—A will also change as the said sheets 22—A, 22—C, 22—D and 22—F are rotated relative to each other without magnetic and/or electric plane rotation, and will also be colored as both the plane polarization and the sheets are rotated. The colors will change as the analyzer is rotated with or without plane and sheet rotation and the analyzed colors will also change as a function of the combined relative rotation of the plane, sheet and analyzer rotation.

The dotted lines of Figure 4 indicate that the normal plane polarization lies in a plane perpendicular to the plane of the paper upon which Figure 4 is drawn. In the same manner the dotted lines of Figure 5 indicate that the normal plane of analyzation lies in the same plane as the plane polarization of light 17. Thus normally the normally plane polarized light 17 will be passed by the analyzer 25 when not wave affected by the double refracting means 22. Or the analyzer 25 may be rotated to extinguish the light 24.

With the proper number of double refracting sheets (see Figure 10) of the selected media in position as shown by Figure 1 and with the analyzer 25 set at the proper angle for the conditions under which the device will be installed and operated, the light 24—A will be colored in a sequence periodically repeated as a function of the electron beam related plane polarization rotation due to the asynchronous and synchronizing pulses of E. M. F. and/or current impressed on the leads 19 and 18.

If the plastic discs 22—A, 22—C, 22—D and 22—F are now replaced by sector portions of discs as R, B and G of Figure 6 so that the number or material of the R portions in the line of the light are different from the B and G portions, and the B portions are different than the G portions, the portions of the light 21 passing through these R, B and G portions will be differently colored for a given plane polarization rotation of the light 17.

I found that the actual color of the light 24—A (when the wave affecting means of Figure 7 is in operating position) varied with the angle of rotation of the plane polarization of light 21. With a proper pulse E. M. F. impressed on the leads 18 and 19, three distinct colors as blue, green and yellow were imparted to the light 24—A.

If this impressed E. M. F. (or current in the case of magnetic rotation) is related to the said electron beam 11, then the light 24—A may be colored blue for every third sweep of the said beam, and thence green and yellow (or any other desired color) in desired sweep sequence as is required for sequential scanning in color television reception.

As the speed of the Kerr cell has been estimated as high as $10^8$, then the color of the light 24—A may be changed at the same speed, or even faster since the three colors may be obtained during one pulse or plane rotation.

I would point out at this time, that many combinations of plane polarization, plane polarization rotation, polarized light wave retarding and affected means and analyzers may be employed by those skilled in the electro-electron-magnetic-optics art without departing from the spirit of my invention. For example, additional optical means may be added to the means of Figure 1 at several points along the optical axis of the light 15 so that the light 17 may pass through the plane polarization rotation medium 31 with parallel rays and concentrated to reduce the area of the said medium 31 so as to in turn reduce the plane rotating energy required. Still further, the analyzing means of Figure 8 may be employed so that the light 24—A will be partly extinguished with every 90 degrees of plane rotation and thus a great mixture of colors will be produced in such a manner that one set of colors will increase in intensity as the other set is decreased.

In any event the colored light 24—A will be intercepted by the surface of the reflector member 26 so as to be reflected according to the contour of the said surface. While the reflecting surface 26—A (and 26—B) is indicated on the drawing by a straight line in order to simplify the drawing, it is obvious that the actual form of the said reflecting surface will be determined by the conditions under which the means of Figure 1 will be installed and operated. Let it be assumed that the said surface is formed so that colored light 24—A will be reflected as colored light 27—28 to the focal point 29. A fluorescent screen 30 is positioned to include the path of the said focal point 29. When the member 30 is properly positioned a colored spot of light 29 will move along a zigzag path periodically repeated with the characteristics of the said electron beam, varying in intensity with the said beam and colored in accordance with the characteristics of the beam related E. M. F. (or current) impressed on the electrodes 18—A and 19—A.

According to my invention, the colored light 29 can be given a predetermined color during the entire scanning period of the active frame area or the light may be given a color only during the interval of a single sweep by properly relating the E. M. F. pulses impressed on the leads by any one of many known methods. Thus the light 27—28 may be (say) red for one sweep, blue for the next sweep and green for the third sweep and thence red again for the fourth sweep and so on periodically repeated down (or across) the said scanning area.

In this event one scanning line after the other will be differently colored and the entire area of the frame will not be given the same color. The plane rotating energy impressed on the terminals 18 and 19 of the plane rotating medium 31 will of course be related as hereinbefore stated to the (say) movement characteristics of the said electron beam 11 as hereinbefore described so that the light coloring action will be definitely related to the movement of the said electron beam.

It is of course contemplated that the means of Figure 1 will also be installed and operated under conditions wherein the high speed at which the said light 27—28 may be electronically colored, it will be possible to differently color each individual elementary area of the screen, or sensitive circuit element 30 and thus the light 27—28 will be changed in color many times during a single sweep across the said frame. This is true, because the plane rotation of the said light 17 can be varied as much as 100,000,000 times per second and the color of the light can be changed many times during a single plane rotation. In fact, it can cover the spectrum colors twice during a single plane rotating cycle. Furthermore there are no moving parts included in the means of Figure 1 and thus no inertia to limit the speed of operation. Light flux, electric flux and magnetic flux will not limit each other to the extent to affect the operation of my device.

The means of Figure 1 can be modified so as to be employed as a black and white receiving station. This is true, because the said derived constant intensity plane rotated light 21 can be permitted to impinge directly (with the means 22 and 25 removed) on the reflecting surface 26—A of the member 26. When the surface of the member 26 is positioned at the proper angle and the plane polarization of the light 24—A is not rotated as it is transmitted through the said medium 31 it will be reflected at right angles to the reflecting surface intercepting it at member 26 as incident light. When the plane polarization of the light 24—A is rotated, it will be reflected as a function of said rotation from the said surface. In accordance with the accepted law in connection with reflected polarized light, the intensity of the spot of light 29 will vary according to the degree of plane rotation of the light 24—A. The said spot of light 29 will then be moved across the intercepting surface of the member 30 according to the immodulated characteristics of the electron beam 11 as it is modulated in accordance with the reflection varying in intensity according to the degree of said plane rotation. Thus the transmitted image will be visibly reproduced on the screen 30 in the same manner as taught in my U. S. Patent No. 2,225,922 issued December 24, 1940.

The operation of the modification of my invention as shown by Figure 2 is somewhat similar to the operation of the means of Figure 1 when used as a color mixer control for scanning, a color receiver television or for black and white receiving. The light 37 derived from the electron beam 35 is passed through conventional lenses 38 and 40 so as to be converged as light 41 to the reflecting surface of the member 42 to be conventionally refracted through a focal point 72 to the screen 53. The light 43 is plane polarized by the light polarizing means 44 and plane rotated by the rotating medium 46. In fact, this reflected light 43 can be polarized, plane rotated, wave affected and analyzed by the means of Figures 4, 5, 6 and 7 in the same manner as hereinbefore described for the light 15 of Figure 1 except that such action occurs after reflection from the surface of the member 42. The light 43 can also be plane polarized by reflection from the surface of the reflector 42 when the same is provided with a polarized light reflecting surface 42—A—42—B. The said surface forming a portion of such material as black glass or Bakelite.

The means of Figure 3 can be used with or without the electron beam producing means of Figures 1 and 2. Let it be assumed that the light 57 is converging and is transmitted through a plane polarizing means 58 and a plane rotating means 62 symmetrically positioned about the focal point 57—A. The light 63 will be plane rotated according to the characteristics of the energy impressed on the leads 60 and 61. The light 63 is then transmitted through the wave affecting means 64 constructed similar to the means 6 and 7 or the like. The wave affected light 65 is then analyzed by the analyzer 66. The colored analyzed light 67 is intercepted by the optical means 68 constituting a screen or a light sensitive circuit element. The said light can also be refracted by transmission through the conventional optical means 38 and 40 of Figure 2 so as to be converged toward the said adjustably intercepting means 68. In this event, the means 58, 62, 64 and 66 may be moved to a required position between the lens member 40 and the screen 68.

According to the modification of my invention as shown by the means of Figure 9 there is provided a beam of light 74 with preferably parallel rays polarized by a rotatable light polarizing means 75 in toothed drive relation with the pinion 76 mounted for rotation with the shaft 77 so that the normal plane polarization may be selectively rotated by rotating the shaft 77. In the same manner the wave affecting means 82 may be selectively rotated by drive relation with the shaft 84 as hereinbefore described. Thus the plane rotating, plane polarizing, wave affecting actions on the light 74 may be selectively varied so as to insure a desired interception by the screen means 90. If the said shafts 77, 84 and 88 are selectively actuated by conventional remotely controlled means (not shown) a great many combinations of plane polarizing, plane polarization rotation, wave retarding or affecting and analyzation may be selectively produced by the adjustment and rotation of the said shafts.

It will be obvious to those skilled in the electro-magneto-electron-optical arts that many well known and conventional elements can be added to the means shown in the drawings to affect the light, current and E. M. F. without departing from the spirit of my invention.

Therefore, while I have shown and described and have pointed out in the annexed claims, certain novel features of my invention, it will be understood that various omissions, substitutions and changes in the form and details of the devices illustrated or in their operation may be made by those skilled in the art without departing from the spirit of my invention.

Having thus described my invention, I claim:

1. Stationary color television apparatus for changing the color of a beam of oscillating light in a periodically repeated sequence of different colors, which comprises means for plane polarizing the said light, means for rotating the said polarization thereof, doubly refracting means so positioned in the path of the said rotated light as to change the wave-length of the said light transmitted therethrough according to the said rotation, means for color analyzing the said doubly refracted light according to the wave-length thereof and screen means for intercepting the said analyzed light, said rotating means being connected to a source of E. M. F. pulses periodically repeated in the said sequence.

2. Color television apparatus for electronically changing the color of an oscillating beam of light in accordance with a sequence of periodically repeated groups of said oscillations which comprises means for producing oscillating plane polarized light, means for rotating the plane polarization thereof according to the said sequence, doubly refracting media selected from the group consisting of acrylate, cellulose acetate, phenol-formaldehyde, polyvinyl acetate, ethyl cellulose, cellulose nitrate, cellulose acetate-butyrate and polystyrene positioned in the path of the said plane rotated light so as to change the wave-length of the portions of the said light transmitted therethrough according to the said sequence, means for color analyzing the said transmitted light according to the wave-length thereof and screen means for intercepting the said color analyzed light, said rotating means being connected to a source of E. M. F. pulses repeated in the said sequence.

3. Simultaneous all-electronic color television apparatus for reproducing a colored image which comprises cathode ray tube means energized for producing an oscillating electron beam having the characteristics of the said image, optical means for obtaining a beam of light from the said tube having the characteristics of the said electron beam, means for plane polarizing the said light, means connected to a source of image synchronizing pulses for rotating the plane polarization, doubly refracting means so positioned in the path of the said rotated light as to change the wave-length of the said light transmitted therethrough according to the said rotation, means for color analyzing the said doubly-refracted light according to the said change and screen means positioned for intercepting the said analyzed light as to cause same to visibly appear as light changing color according to the said rotation and varying in motion and intensity with the said electron beam, said image synchronizing pulses being modulated by superimposed color field synchronizing pulses related to the said energization of the said tube.

4. Color television receiver apparatus which comprises cathode ray tube means energized so as to provide an oscillating electron beam moving along a periodically repeated zig-zag screen path, optical means for obtaining a beam of light from the said tube screen having the characteristics of the said electron beam and to direct the said obtained light with reduced oscillations through a plane normal to the optical axis of the said light, means for plane polarizing the said obtained light, means for rotating the plane of the said polarized light at and near the said normal plane, means constituting portions of doubly-refracting material rotatable in planes normal to the said optical axis and positioned one after the other in the path of the said rotated light as to change the wave-length of portions of the said light transmitted therethrough according to the said plane rotation and the said portion rotation, means for color analyzing the said transmitted light according to the change in wave-length thereof and screen means positioned for intercepting the said color analyzed light so as to cause same to visually appear as a spot of light changing color according to the said rotations and having the characteristics of the said electron beam.

5. Color television apparatus comprising cathode ray tube means providing an oscillating modulated beam of electrons when energized, optical means arranged for obtaining a light beam from said tube means having the characteristics of the said electron beam, means for plane polarizing the said obtained light, magneto-optical means for rotating the said plane polarization in certain frame and field relation to the said characteristics, means comprising portions of doubly-refracting material symmetrically positioned about the optical axis of the said beam and in such phase relation as to respectively doubly-refract portions of the said beam transmitted therethrough in a different band of wave-lengths, means for analyzing the said transmitted light according to the band wave-length thereof and screen means for intercepting the said analyzed light, said rotating means connected to a source of frame and field synchronizing E. M. F. pulses related to the said energization of the said tube.

6. All-stationary television receiver apparatus for electronically changing the wave-length of a beam of oscillating light during a given oscillation which comprises cathode ray tube means for providing the said light with an initial oscillating length, a first optical means for directing the said light with reduced oscillating length through a plane normal to the optical axis of the said light, means for plane polarizing the said light, means for rotating the said polarization at and adjacent to the said plane, said rotating means being connected to a source of E. M. F. pulses related to the said oscillation, doubly-refracting means for changing the wave-length of the said rotated light according to the said pulses, a color analyzing member for analyzing the said refracted light and a second optical means for directing the said analyzed light to a screen member.

7. Simultaneous color television receiver apparatus for reproducing a colored image which comprises an image reproducing cathode ray tube comprising a source of image modulated oscillating light, optical elements for directing the said light through two spaced apart focal planes respectively normal to the optical axis of the said light, means for plane polarizing the said directed light, means for rotating the plane polarization of the said polarized light, means for doubly-refracting the said rotated light, means for color analyzing the said refracted light according to the said rotation and screen means positioned approximately at one of the said focal planes, said rotating means being positioned approximately at the other said focal plane and connected to a source of E. M. F. pulses related to the color characteristics of the said image and the said oscillations.

8. All-electronic stationary color television apparatus for producing a sequence of differently colored portions of a ray of light during a single oscillation of the said ray, which comprises means for polarizing the said light, means for rotating the said polarization, a first doubly-refracting means, a second doubly-refracting means, color analyzing means and screen means, said means being positioned one after the other along the optical axis of the said light, said doubly-refracting means constituting sheet-like portions of material capable of doubly refracting the said light into at least two bands of wave-lengths, said rotating member being connected to a source of E. M. F. pulses varying according to the said sequence during the said oscillation.

9. An all-electronic simultaneous color television receiver system which comprises cathode ray tube means for providing a beam of image modulated light oscillating over a first area lying in a first plane normal to the optical axis of the said beam, optical means for directing the said light through a smaller second area lying in a second plane normal to the said optical axis, means positioned between the said planes for polarizing the said light, means for rotating the plane polarization of the said light, doubly-refracting means for changing the wave-length of the rotated light directed therethrough according to the said rotation, means for color analyzing the said doubly-refracted light according to the said rotation and screen means for intercepting the said analyzed light, said rotating means being connected to a source of E. M. F. pulses related to the said oscillations and the color characteristics of the said image, said doubly-refracting means comprising material for doubly-refracting plane polarized light varying over at least two bands of wave-lengths.

10. Color television receiver apparatus for coloring a beam of image action modulated light, cathode ray tube means for providing the said light when energized, optical means for directing the said light in a converging manner, means for reflecting the said converging light through a focal plane normal to the optical axis of the said reflected light, means for plane polarizing the said reflected light, means for rotating the said plane polarization at and adjacent the said plane, means for doubly-refracting the said plane rotated light transmitted therethrough, means for color analyzing the said refracted light and screen means for intercepting the said analyzed light, said rotating means connected to a source of image frame synchronizing pulses upon which is superimposed color field sychronizing pulses related to the said image actions.

11. Electronic color television apparatus for coloring picture modulated light according to the color characteristics of the said picture, which comprises cathode ray tube means providing the said light when energized, means for polarizing the said light, means for plane rotating the said polarized light, means for doubly-refracting the said rotated light, means for color analyzing the said refracted light, means for reflecting the said analyzed light and screen means for intercepting the said reflected light, said plane rotating means being connected to a source of picture synchronizing pulses, said pulses being related to both the said characteristics and the said modulations, said doubly-refracting means comprising at least two adjustable elements positioned one after the other along the path of the said light.

HOWARD J. MURRAY.

REFERENCES CITED

The following references are of record in the file of this patent:

UNITED STATES PATENTS

| Number | Name | Date |
|---|---|---|
| 1,913,795 | Deisch | June 13, 1933 |
| 2,109,540 | Leishman | Mar. 1, 1938 |
| 2,118,160 | Cawley | May 24, 1938 |
| 2,163,530 | Thieme | June 20, 1939 |
| 2,184,999 | Land | Dec. 26, 1939 |
| 2,225,922 | Murray | Dec. 24, 1940 |
| 2,263,684 | Ryan | Nov. 25, 1941 |
| 2,301,254 | Carnahan | Nov. 10, 1942 |
| 2,328,219 | Land | Aug. 31, 1943 |
| 2,350,892 | Hewson | June 6, 1944 |
| 2,393,968 | Burchell et al. | Feb. 5, 1946 |